(12) United States Patent  (10) Patent No.: US 8,051,099 B2
Hamilton, II et al.  (45) Date of Patent: Nov. 1, 2011

(54) ENERGY EFFICIENT DATA PROVISIONING

(75) Inventors: Rick A. Hamilton, II, Charlottesville, VA (US); Jenny S. Li, Danbury, CT (US); Vivek Salve, Poughkeepsie, NY (US); Anne R. Sand, Peyton, CO (US); Elisabeth R. Stahl, Shaker Heights, OH (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 12/117,193

(22) Filed: May 8, 2008

(65) Prior Publication Data

US 2009/0282044 A1   Nov. 12, 2009

(51) Int. Cl.
*G06F 17/30* (2006.01)
(52) U.S. Cl. ................. 707/783; 707/E17.007
(58) Field of Classification Search .......... None
See application file for complete search history.

(56) References Cited

U.S. PATENT DOCUMENTS

| 5,313,631 | A | 5/1994 | Kao |
| 6,732,241 | B2* | 5/2004 | Riedel ............. 711/154 |
| 6,775,673 | B2 | 8/2004 | Mahalingam et al. |
| 6,789,115 | B1 | 9/2004 | Singer et al. |
| 6,839,704 | B2 | 1/2005 | Hughes et al. |
| 7,003,560 | B1* | 2/2006 | Mullen et al. ............ 709/223 |
| 2001/0029432 | A1 | 10/2001 | Gidwani |
| 2003/0191758 | A1 | 10/2003 | Majewski et al. |
| 2003/0233437 | A1 | 12/2003 | Kitada et al. |
| 2004/0064442 | A1* | 4/2004 | Popovitch .......... 707/3 |
| 2005/0055351 | A1* | 3/2005 | Barton et al. ........ 707/10 |
| 2005/0125463 | A1 | 6/2005 | Joshi et al. |
| 2005/0251802 | A1* | 11/2005 | Bozek et al. ........ 718/1 |
| 2005/0268121 | A1* | 12/2005 | Rothman et al. ...... 713/300 |
| 2006/0004884 | A1 | 1/2006 | Kling et al. |
| 2006/0080371 | A1 | 4/2006 | Wong et al. |
| 2006/0167883 | A1 | 7/2006 | Boukobza |
| 2007/0011209 | A1 | 1/2007 | Wietlisbach et al. |
| 2007/0130234 | A1 | 6/2007 | Ikegaya et al. |
| 2007/0150488 | A1 | 6/2007 | Barsness et al. |

FOREIGN PATENT DOCUMENTS

EP   1215590 A2   6/2002

OTHER PUBLICATIONS

Green Storage Explained http://searchstorage.techtarget.com/generic, Date: Nov. 29, 2007.

* cited by examiner

*Primary Examiner* — Shyue Jiunn Hwa
(74) *Attorney, Agent, or Firm* — George R. McGuire; Bond Schoeneck & King

(57) ABSTRACT

A method and system for provisioning data that has been collected and stored in a source database. The source database is a database that consumes a large amount of power and drains the company's database resources. The method and system determine which data should be provisioned and sent to a target server, the target server being more energy efficient than the source database and less exhausting of company resources. Various factors, such as the amount of data being requested and the frequency of change of the requested data, determine whether a transfer of data from the source database to the more energy efficient target database should be performed.

22 Claims, 5 Drawing Sheets

ENERGY EFFICIENT DATA PROVISIONING

BACKGROUND OF THE INVENTION

The present invention relates generally to energy efficiency across the data center, and more particularly to provisioning of data using energy-efficient methods.

Energy efficiency across the entire data center is becoming a top concern for corporations around the world. This problem requires consideration of all energy efficiency components of the data center, from component levels through server and system levels, and concluding with the complete data center. At the system level, storage devices are an extremely important part of the equation, which needs to be analyzed. Disk systems can require substantial amounts of power to operate and cool, and in many cases, can require more power than the server itself.

Data can be stored in different ways and in different formats. Currently, one of the most popular ways of storing and managing data is with the use of a Relational Database Management System (RDBMS). FIG. 1 illustrates this type of system. The RDBMS 10 stores data in data files 12 on disks 14. The data is further organized into tablespaces and tables 16 holding similar or unique sets of data. Clients/users 18 access this data and conduct their day-to-day business operations on this data. The user queries request data to be read from database 10. Data must be retrieved from data files 12 on disks 14 and transferred into the memory 20 of the database system as data blocks 22. Arrow 21 shows the transfer of data from disks 14 to data blocks 22. The data is then accessed by the user 18. If another client/user requests a different set of data and the memory is not able to hold or accommodate both sets of data, then the older data blocks 24 are swapped back (shown by arrow 25) to disks 14 to allow space for new data from disks 14 to be deposited into memory 20. These operations consume Central Processor (CP/CPU) 26 and Input/Output (I/O) resources, which consume a large amount of power. This constant movement of data back and forth from memory to disks consumes power and exhausts system resources.

It is a primary object of the invention to provide a method and system for reducing power and energy consumption by large database systems. It is another object of the invention to provide an efficient method and system for moving data from a low energy-efficient system to a high energy-efficient system. It is a further object of the invention to provide a method and system for synchronizing provisioned data with source data. It is yet another object of the invention to provide a method and system for deleting provisioned data after it is no longer being accessed.

SUMMARY OF THE INVENTION

These and other objects and advantages are accomplished by a method for provisioning data that has been collected and stored in a source database. The source database is a database that consumes a large amount of power and drains the company's database resources. Specifically, the method of the present invention determines which data should be provisioned and sent to a target server. The target server is more energy efficient and does not exhaust large amounts of company resources in comparison to the source database in the source system. The term "energy efficient" server in this invention describes a system that consumes relatively small amounts of power, in terms of electricity, in comparison to the source system. In one aspect of the method of the invention, the location of the data is checked. In another aspect of the method of the invention, the amount of data being requested is evaluated. In yet another aspect of the method of the invention, the number of users requesting the data is determined. In still one more aspect of the invention, the rate or frequency that the data is updated or changed is evaluated. Depending upon these various factors, a determination is made as to whether a transfer of data should be made from the source database to a more energy efficient target database.

In accordance with another embodiment, a system is provided for provisioning data from a source database to a more energy efficient target database. A user access module is linked to the source database and the target database. One or more users request data from the source database by submitting one or more queries. The data requested by the one or more users is moved from the source database to a target database if certain criteria are met. Criteria include the amount of requested data and the frequency at which the requested data changes. If both of these are larger or higher than a predefined threshold, the requested data is moved from the source database to a target database.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
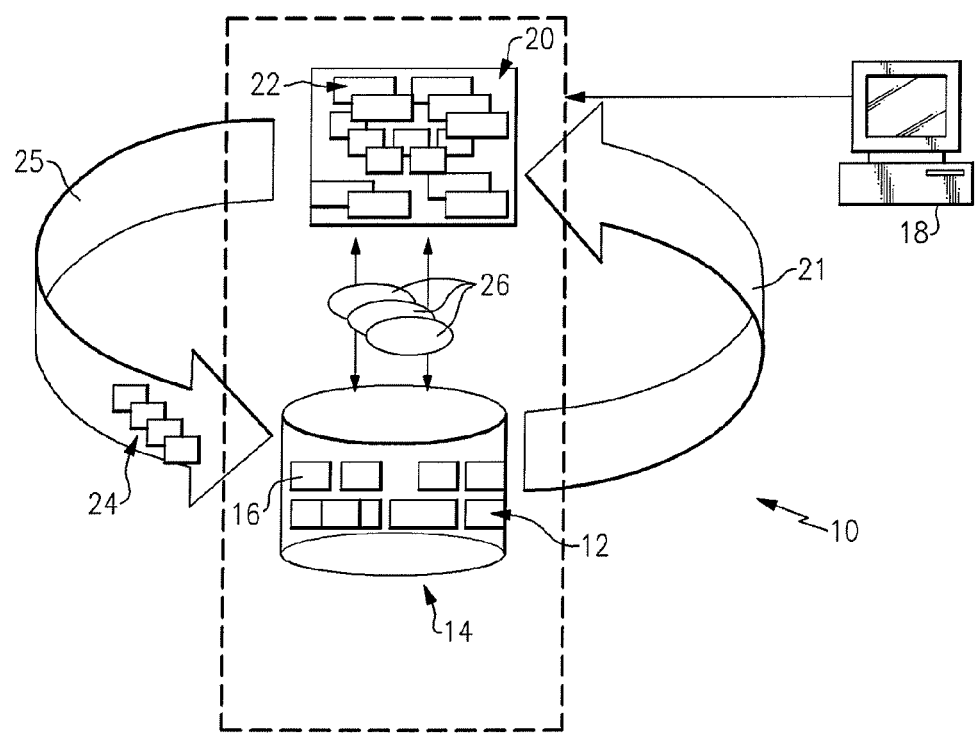
FIG. 1 is a schematic view of a prior art data management system.
Figure 2:
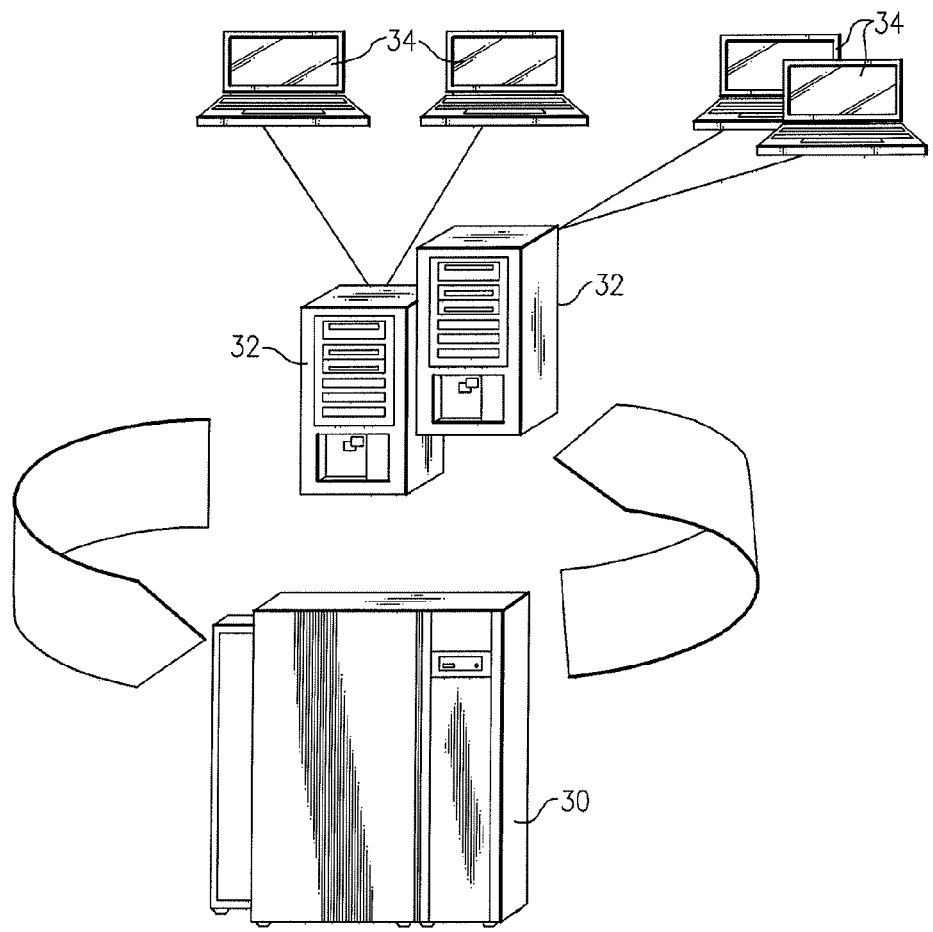
FIG. 2 is a schematic view of the data provisioning system of the present invention.

As will be appreciated, the present invention provides an effective method for reducing energy consumption of certain types of computer systems. Reference is made to FIG. 2, which illustrates the system and method of the present invention. A source database such as a large computer 30, collects and/or stores large volumes of data. Data is stored in large tables or clusters of tables in the storage device of large computer 30. Frequently requested data that is stored on a large computer 30 is moved to one or more target servers 32. Users utilize access modules 34 to submit queries requesting data from the stored data in mainframe computer 30. The queries and user traffic are then redirected to servers 32, which serve as the new, temporary home for the queried data. Target server 32 may be predefined or it may be determined by a configuration management database (CMDB) by viewing the current infrastructure and searching for the best possible candidate. It should be mentioned that source system 30 may be any system that consumes power and exhausts system resources. Examples include, but are not limited to, mainframes, servers, blade systems and external storage devices, such as disks. Moreover, target server 32, also referred to as a "green server," may be any system that is energy efficient or more energy efficient than source system 30. Examples include, but are not limited to, mainframes, servers, blade systems and external storage devices such as disks. User access module 34 can be any device whereby a user can connect to the source and target systems and access the information from either or both systems. Examples include, but are not limited to, desktops, laptops, or any mobile devices.

The following Table 1 comparatively shows power consumption of types of servers. As set forth in the Table, systems recommended for use as green servers consume 11,000 to 12,000 kilowatts per month compared to a less green system, which consumes 67,000 kilowatts per month. A configuration management database (CCMDB) maintains the information shown in Table 1 including the power consumption of source system 30 and a list of candidate target green servers 32. This information in Table 1 is used by the provisioning system of this invention.

TABLE 1

Power Consumption of Servers

| Server | Green Server | Server Type | Storage | Space Available | Power (watts/ operations) | Power Used So Far | Max. Power consumption limit (kilowatts/ month) |
|---|---|---|---|---|---|---|---|
| 1 | Yes | System-1 | IBM | 1200 GB | 300 | 3000 | 11000 |
| 2 | Yes | System-2 | Net Apps | 4600 GB | 325 | 3500 | 12000 |
| 3 | No | System 3 | ABC | 8900 GB | 6000 | 3500 | 67000 |

Figure 3:
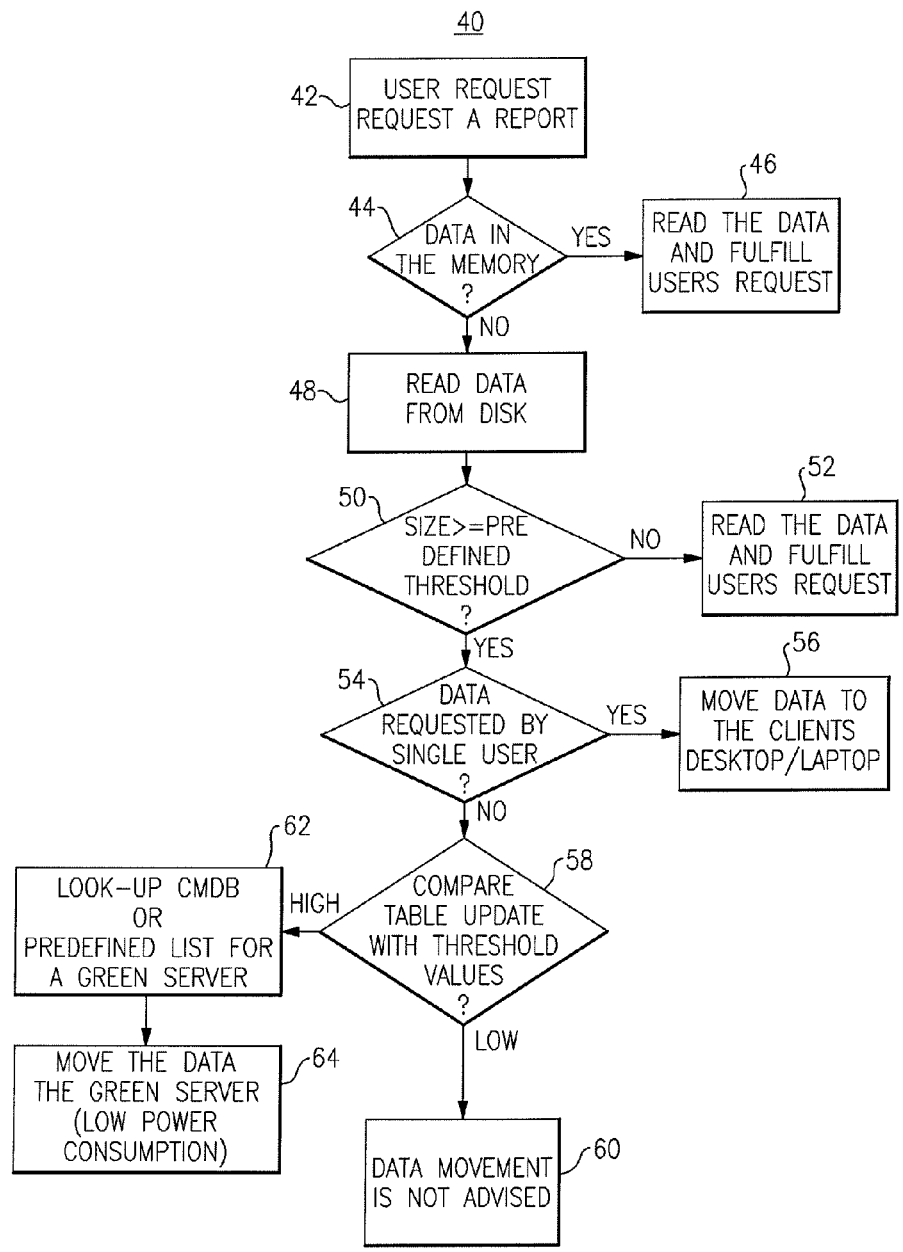
FIG. 3 is a flow chart showing the logic for the data provisioning system of the present invention.

The provisioning operation of determining if data should be moved from source system 30 to target green server 32 is more specifically described in the following steps with reference to FIG. 3, which shows the logic 40 of the provisioning system of the present invention. A user or client using user access module 34 connects to source system 30, which contains volumes of data, and executes a query to access certain data from source system 30, as shown at step 42. The data in source system 30 has been previously collected and typically continues to be updated. It may be historical data or very recently collected data that is constantly changing and/or being updated. Although the concepts outlined herein focus on RDBMS, other data types may used, including but not limited to, non-relational data, blocks of computer data, any type of application specific computer file (e.g. spreadsheets, word processing documents) and computer executable files.

Logic 40 of source system 30 will check to see if the requested data is in the memory as shown in step 44. If the data was recently or previously requested, it may be in the memory and the query will be executed and fulfilled as shown in step 46. Accordingly, the requested data is sent to the client. If the requested data is not found in the memory, logic 40 will ask the data to be retrieved from the storage device, such as from disks in source system 30, as shown in step 48. At this point, the energy efficient data provisioning logic of the present invention is implemented to determine whether this queried data should be moved to a more energy efficient target server.

Logic 40 allows for the setting of a threshold level for the amount of the data that is being requested or queried. This preset threshold level may be changed, adjusted and fine-tuned based on the system, the type of data being accessed, the frequency of data being accessed, the amount of data being accessed, patterns of data access, users accessing the system and other factors that may influence the power of the system. The threshold level limits how much data can be retrieved before data provisioning is triggered. This is shown at step 50. If the amount of data being requested is below the predefined threshold, the data is retrieved and sent to the client, as shown in step 52.

If the size or amount of the data being requested is larger than the threshold, the logic checks to see if the data is being requested by a single user or more than one user, as shown in step 54. If the client is a single user, the data is retrieved and sent to the client, as shown in step 56.

If the data is requested by more than one user, the logic moves onto step 58, which checks the frequency of data change. The logic allows for setting a second threshold with respect to how frequently the data that is being requested is changed. The data is stored on the source system in tables or clusters of tables. The threshold level covers the frequency that the tables are updated. The frequency of change may be measured in seconds, minutes, hours, days, weeks, and/or years. This measure of frequency also may be dependent upon whether a cluster table is being requested by a user or client, the percentage of tables updated in the cluster, and the percentages of users posting updates to the data. If this threshold is not reached, data movement is not advised, as shown in step 60. Data remains in the source system and a copy is sent to the client.

If the value is higher than the threshold, the logic moves onto step 62, whereby a target green server is selected from a list of preselected systems or if a list of preselected systems is not provided, a check is done by a management database system to determine the best location to send the data, from a list of candidate target servers as shown in Table 1. Either way, the target server that is selected (either the green server or the best possible server as determined by the management database) consumes less power than source system 30. The data is then moved to target server 32, as shown in step 64. The users 34 are redirected to green servers 32 (as shown in FIG. 2) for retrieving the requested data. The configuration management database also keeps an index of the location of the energy efficient server 32, where the data is provisioned. From this point onward, users who request the same data are redirected to target server 32 automatically.

The following non-limited example illustrates the present invention.

Example

In December 2007, a sales report is requested by Company Y from each sales representative regarding the number of green chairs each sales representative sold in the months of November and December, 2007 in the state of New York. Each client or user starts up a graphical user interface (GUI) on his laptop and connects to Company Y's business warehouse. The business warehouse system is populated with historical data which is used for reports and ad-hoc queries by multiple users. Each client wants to generate a report that displays the number of green chairs he sold in the months of November and December, 2007 in the state of New York.

Each client executes a query, which looks for data in the memory of the computer system. If the data was previously requested and therefore found in the system's memory, the query is executed and fulfilled and the data is sent to the client. Since the query does not find all the data it needs from the system's memory, it asks for the data to be retrieved from the system's disks.

The amount of data being requested is above the predefined threshold, so the logic checks to see if the data is being requested by a single user or more than one user. Since this client is not a single user, but includes all the sale representatives in Company Y, the logic must check the frequency of change of the data being requested. It is the month of December, 2007, and the query includes all sales of green chairs in the months of November and December, 2007. Therefore, the frequency of data change is high, since data is constantly be entered into the warehouse system, based on sales being currently made in December, 2007. A green server is selected from a list of preselected systems and the data is moved from the business warehouse system to the green server, which consumes less power than the source system. The clients are redirected to the green server for retrieving the requested data.

In another aspect of the present invention, in order to maintain consistency between the requested data that is moved to target server or green server 32 and the stored data in source system 30, the data must be periodically refreshed. Updates and changes may be made to the data located in the target server 32 and/or to the same data located in the source system 30. The data provisioning system of the present invention uses a refresh mechanism to maintain consistency between the copies of data. This involves the use of a tolerance threshold level. As with the previously discussed preset thresholds, the threshold may be changed, altered, refined, etc., depending on the level of consistency desired between the two sets of data. The accuracy of the reports rendered from the data will be dependent on the level of consistency maintained between the two sets of data. Recently updated data or frequently updated data will require a higher consistency. Therefore, a low tolerance level should be set. For example, if the client/user requests old historical data that remains constant, the copy of the data on target server 32 does not need to be refreshed or updated from the copy of the data that resides in source system 30. Therefore a high tolerance level will be set for the refresh mechanism to indicate that this data will be refreshed less frequently. Alternatively, if the data is currently changing, as in the Example above, the preset threshold should be set at a high level of consistency; therefore a low tolerance level will be set. This will provide frequent synchronization between the data on source system 30 and the data on target server 32. The preset threshold in the refresh mechanism is used to maintain consistency of data and can be tuned to fit different types of customer data.

Figure 4:
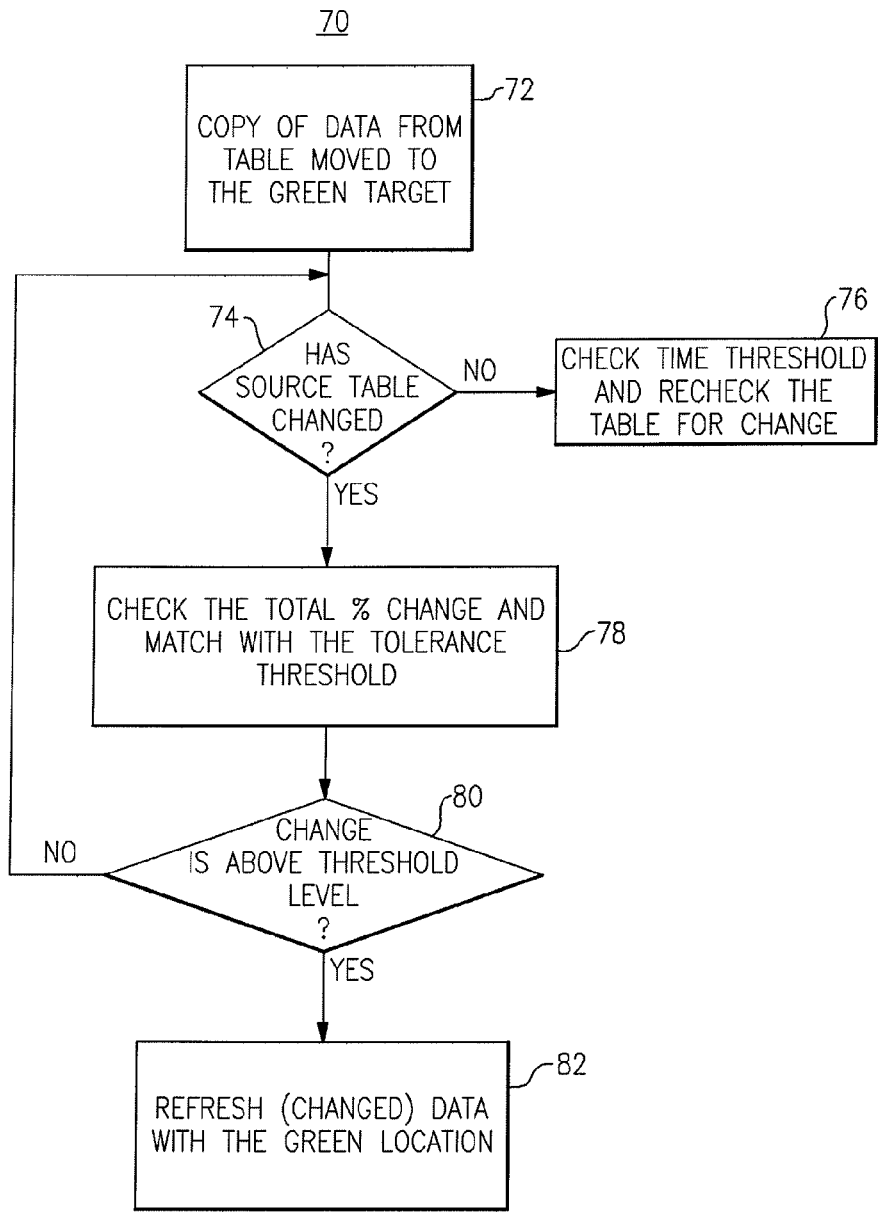
FIG. 4 is a flow chart of the refresh mechanism used in the data provisioning system of the present invention.

Reference is made to FIG. 4 which more clearly illustrates the refresh mechanism of logic 70 of this invention. When a copy of the data from one or multiple tables is moved from the source system 30 to a green server as shown in step 72, the refresh mechanism checks the source tables for changes and/or updates that may have happened after the copy of data was moved to the green server 32, as shown in step 74. If no changes are found in the source tables or table, the tables are rechecked after an interval of time, as shown in step 76. Rechecking will occur at regular intervals as may be determined by the type of data that is being rechecked and may be fine tuned and lessened if no changes are made.

If changes have occurred, the logic looks for the total percentage changed and matches it with the preset threshold level for changed data, as shown in step 78. There are various options to predefine tolerance level. One way of defining the threshold for the refresh mechanism is to base the tolerance level on the percentage of data changed from source system 30 or target server 32. For example, a refresh is needed if the source data has changed thirty percent, or the data on the target server 32 has reached a certain number of updates over a set time, e.g., the last two hours.

Another way of defining the threshold for the refresh mechanism is by the importance of the data that is being accessed. For example, any data that is associated with, for example, the Fall Plan Budget or with Quarterly Sales on New Products is of high importance as opposed to data associated with the Daily Cafeteria Menu. For the highly important data, a lower tolerance threshold can be set since it is critical to have the data updated as frequently as possible. For less important data, a higher tolerance threshold can be set.

Yet, one more way of defining the threshold is by the roles of the users and/or the applications. If the data is accessed by a particular application that is important, such as for example, Executive Fall Plan Budgets, then the tolerance threshold may be set accordingly to ensure that the refresh rate is more frequent. Similarly, certain data accessed by more senior users of an organization, for example the CFO of the company, can be set at a low tolerance threshold for frequent refreshing.

For the examples listed above, any change below the tolerance level threshold will not trigger refresh of the data as shown by step 80, and the logic will repeat steps 74 through 78, periodically continuing to check for changes until the threshold is met. The frequency of executing the refresh mechanism logic 70 can be preset in the configuration management database. At this point, as depicted in step 82, the data in target server 32 and the data in source server 30 are refreshed so that all updates and changes are consistent in both sets of data.

In order to maintain efficiency and energy conservation of this system, the target servers must be purged of old data that is no longer being accessed. Data provisioned to target servers 32 should be deleted after the queries have been completed or when the number of access decreases, to provide space for new data that requires provisioning. The deletion process also completes the full life cycle of the data.

Figure 5:
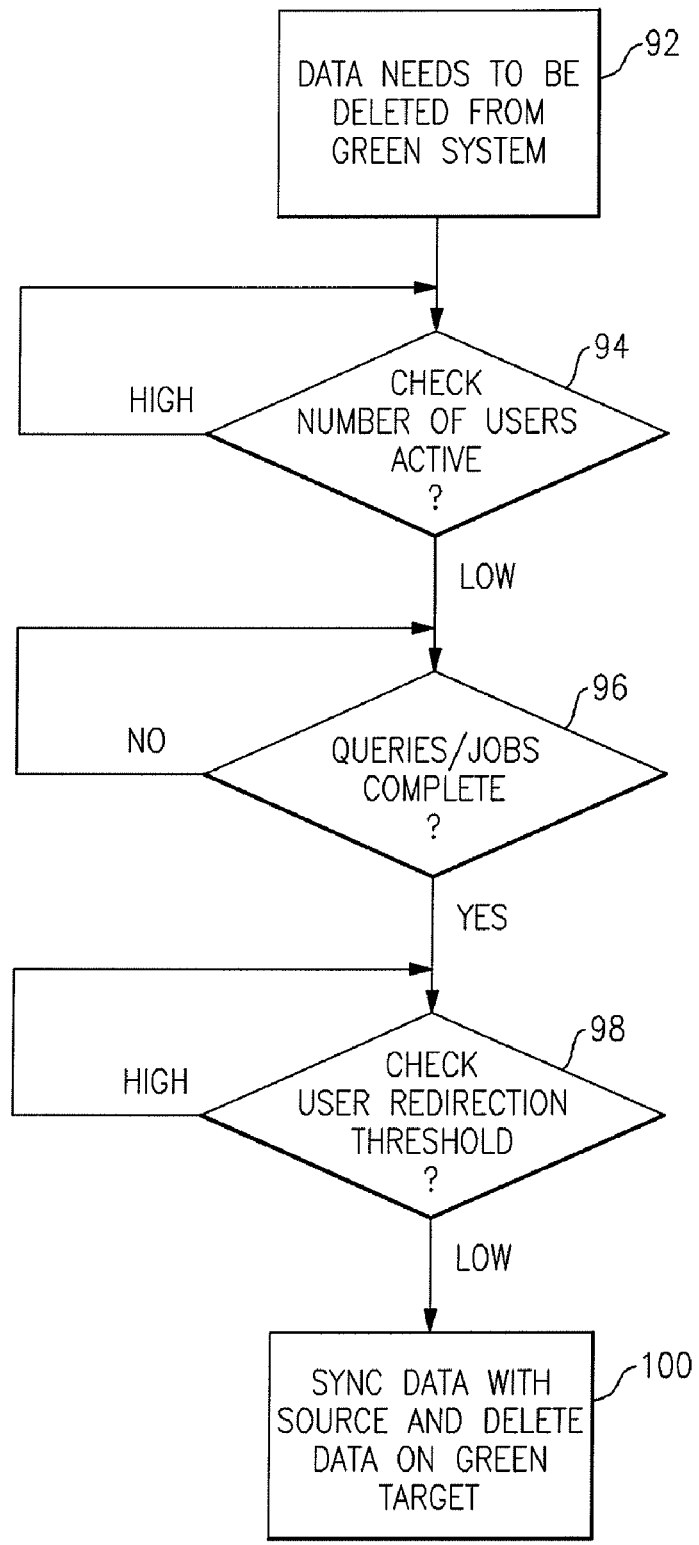
FIG. 5 is a flow chart of the deletion logic for the data provisioning system of the present invention.

Reference is made to FIG. 5, which illustrates the deletion logic 90 of the system. The first step of the deletion process, step 92, looks at the amount of data on target server 32 and determines that data should be deleted from the server to allow for the provisioning of other data. For example, if the memory buffer or the disk space of the target server 32 is approaching its maximum, then the deletion logic can be activated to remove old or rarely accessed data. Alternatively, a default duration can be set for each provisioned data on the target server 32 to indicate its expiration date, and the data can be either removed automatically or renewed for a new expiration date when the it expires.

Next, if there is a need to delete data on target server 32 to free up space in the memory or disks, then the number of users who are logged in and using the data located on target green server 32 is checked, as shown in step 94. This is the first of three tests to determine if the data is a candidate for deletion. If the number of users is high, the data being accessed should not be deleted. The active user check is executed again after a preset interval. The number of active users is continually rechecked until the number falls below an active users threshold. If the number of active users is below the threshold limit, the next check is executed.

The second test to determine if the data on target server 32 is a candidate for deletion is to check the completion of the query and/or job, as shown in step 96. If the queries are completed, the data passes the second test. If the queries are still active, the logic rechecks the query completion after a preset interval of time and continues until all queries are completed. The preset interval is flexible and can be changed based on customer needs.

Once the queries are completed, this indicates no users are currently modifying the data. The third test is performed. As shown in step 98, user redirection to target server 32 is checked. A series of checks are executed including: whether the users are using system resources on target green server 32, whether the user session and/or processes are active, and the number of active users and/or processes and/or sessions being performed. If any of the results are high and the threshold continues to be met, the logic continues to perform checks in these areas. Once the results drop below the threshold level, the data from target green server 32 is synchronized with the data in the source server 30, and it is then deleted from target green server 32, as shown in step 100. This provides space for new data to be provisioned to target-green server 32.

The invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended embodiments.

What is claimed is:

1. A method for provisioning data comprising:
   collecting data from one or more sources and storing it in a first database to provide stored data, wherein said first database comprises a non-transitory computer-readable storage medium;
   providing one or more users with access to the stored data in the first database by permitting the one or more users to submit one or more queries to the first database for retrieving queried data;
   assessing the one or more queries submitted to the first database to determine if
   (a) the amount of the queried data being requested is larger than a first preset threshold; and
   (b) the frequency of change of the queried data is higher than a second a preset threshold and,
   wherein if the first and second preset thresholds are met, migrating a copy of the queried data from the first database to a second database, wherein the second database comprises a non-transitory computer-readable storage medium that consumes less power than the first database; and
   periodically synchronizing the stored data and the queried data that has been moved to the second database to maintain consistency between the queried data in the second database and the stored data in the first database;
   wherein the stored data and the queried data are not synchronized until a third preset threshold is met, wherein the third preset threshold is predefined by one or more criteria comprising a predetermined percentage of data changed wherein said percentage is greater than zero, the importance of the queried data, the role of the one or more users accessing the queried data, and the applications for the queried data.

2. The method of claim 1, whereby the first database comprises a memory and a storage area, the method further comprising:
   prior to assessing the one or more queries submitted to the first database for amount and frequency of change, determining whether the queried data is in the memory or the storage area of the first database; and
   wherein, if the queried data is located in the memory, leaving the queried data in the memory, creating a copy of the queried data, and sending the copy of the queried data to the one or more users.

3. The method of claim 1 further comprising:
   wherein if the amount of data being requested is lower than the first preset threshold, leaving the queried data in the first database, creating a copy of the queried data, and sending the copy of the queried data to the user.

4. The method of claim 1 further comprising:
   after assessing if the amount of the queried data being requested is larger than a first preset threshold and prior to assessing if the frequency of change of the queried data is higher than a second a preset threshold, the step of determining if the one or more users is a single user, and if the one or more users is a single user, leaving the queried data in the first database, creating a copy of the queried data, and sending the copy of the queried data to the user.

5. The method of claim 1 further comprising:
   wherein if the frequency of change of the queried data is lower than the second preset threshold, leaving the queried data in the first database, creating a copy of the queried data, and sending the copy of the queried data to the one or more users.

6. The method of claim 1 wherein the first database comprises source tables and wherein the frequency of change of the data is calculated by one or more of (i) how often the source tables are updated, (ii) the percentages of source tables being updated, and (iii) the percentage of users posting changes to the source tables.

7. The method of claim 1 wherein the second database is selected from a list of preselected databases or wherein the second database must be determined by a management database system, whereby the management database system manages a list of candidate locations and selects the second database from the lists of candidate locations.

8. The method of claim 7 wherein after the copy of the queried data is migrated from the first database to the second database, further comprising:
   recording a timestamp of the copy of the queried data that has been migrated to the second database; and
   creating an index of the location of the second database for future queries of the queried data.

9. The method of claim 1 wherein the one or more users are redirected to the second database to access the queried data that has been migrated to the second database.

10. The method of claim 1 wherein periodically synchronizing is dependent on the frequency that the stored data or the queried data is updated.

11. The method of claim 1 wherein the stored data comprises source tables and the frequently accessed queried data comprises a copy of the source tables and whereby periodically synchronizing comprises:
    checking the source tables and the copy of the source tables for changes or updates that occurred after the frequently accessed queried data was moved to the second database;

if no changes have been made, periodically checking the source tables and the copy of the source table for changes; and if changes have been made, synchronizing the stored data and the queried data.

12. The method of claim 1 further comprising deleting the queried data on the second database after it is no longer being accessed comprising:

checking the number of users that are logged onto the second database to determine if the number is higher or lower than a fourth preset threshold;

if the number of users is higher than the fourth preset threshold, periodically checking the number of users until the number of users drops below the fourth preset threshold;

after the number of users drops below the fourth preset threshold, checking the queries to see if all queries have been completed;

if the queries have not been completed, periodically checking the queries are until all queries have been completed;

after all the queries have been completed, checking the second database to determine (i) if any users are logged onto the second database, (ii) if the logged on users are active and (iii) if the number of sessions performed by the active users is above or below a fifth preset threshold; and if number of sessions is below the fifth preset threshold, synchronizing the queried data with the stored data on the first database, and the deleting the queried data from the second database.

13. The method of claim 1 wherein the first database comprises a computer, a server, a blade system, or an external storage device.

14. The method of claim 13 wherein the external storage device comprises disks.

15. The method of claim 1 wherein the second database comprises a server, a laptop computer, a desktop computer or a mobile device.

16. A system for provisioning data comprising:

a source system having a memory and a storage device, wherein the memory and the storage device contain stored data;

a target system having a memory and a storage device, wherein the target system storage device consumes less power than the source system;

wherein a copy of stored data is capable of being migrated from the source system to the target system after a user requests stored data from the source system and the stored data meets one or more criteria comprising the amount of stored data requested is larger than a first preset threshold and the frequency of change of the stored data is higher than a second preset threshold;

a user access module for communicating with the source system and the target system for accessing stored data from the source system or the target system and a component for periodically synchronizing the stored data in the source system and the copy of the stored data in the target system to maintain consistency between the stored data in the source system and the copy of the stored data in the target system;

wherein the stored data and the queried data are not synchronized until a third preset threshold is met, wherein the third preset threshold is predefined by one or more criteria comprising a predetermined percentage of data changed wherein said percentage is greater than zero, the importance of the queried data, the role of the one or more users accessing the queried data, and the applications for the queried data.

17. The system of claim 16 wherein the source system is selected from the group consisting of a computer, a server, a blade system, or an external storage device.

18. The system of claim 17 wherein the external storage device comprises disks.

19. The system of claim 17 wherein the user access module is selected from the group consisting of a laptop computer, a desktop computer, or a mobile device.

20. The system of claim 16 wherein the target system is selected from the group consisting of a computer, a server, a blade system, or an external storage device.

21. The system of claim 16 further comprising a management database system, wherein the management database system:

(i) manages a list of candidate locations for the target system;

(ii) selects a target system from the list of candidate locations;

(iii) creates a copy of the stored data from the source system and inserts it into the target system;

(iv) creates an index of the location of the target system for future queries of the stored data; and redirects users to the target system for the stored data.

22. The system of claim 16 further comprising at least one component for deleting the copy of the stored data on the target system after it is no longer being accessed.

* * * * *